US012674223B2

(12) United States Patent
da Silva

(10) Patent No.: US 12,674,223 B2
(45) Date of Patent: \*Jul. 7, 2026

(54) LOWER TEMPERATURE PELLETIZING PROCESS OF IRON ORE FINES

(71) Applicant: Sidney Nicodemos da Silva, Belo Horizonte (BR)

(72) Inventor: Sidney Nicodemos da Silva, Belo Horizonte (BR)

( * ) Notice: Subject to any disclaimer, the term of this patent is extended or adjusted under 35 U.S.C. 154(b) by 746 days.

This patent is subject to a terminal disclaimer.

(21) Appl. No.: 17/986,610

(22) Filed: Nov. 14, 2022

(65) Prior Publication Data

US 2023/0175094 A1      Jun. 8, 2023

Related U.S. Application Data

(60) Provisional application No. 63/244,913, filed on Sep. 16, 2021.

(51) Int. Cl.
| | |
|---|---|
| *C22B 1/244* | (2006.01) |
| *C08L 3/02* | (2006.01) |
| *C22B 1/24* | (2006.01) |

(52) U.S. Cl.
CPC ................ *C22B 1/244* (2013.01); *C08L 3/02* (2013.01); *C22B 1/2406* (2013.01)

(58) Field of Classification Search
CPC .................................. B22F 1/105; B22F 3/18
See application file for complete search history.

(56) References Cited

U.S. PATENT DOCUMENTS

| | | | | | |
|---|---|---|---|---|---|
| 2,888,341 | A | * | 5/1959 | Lawless | ................ C22B 1/2406 |
| | | | | | 75/768 |
| 3,024,101 | A | * | 3/1962 | Violetta | ................ C22B 1/2413 |
| | | | | | 266/178 |

(Continued)

FOREIGN PATENT DOCUMENTS

| | | |
|---|---|---|
| BR | 102016025630 A2 | 5/2018 |
| BR | 102019009592 B1 | 7/2020 |

(Continued)

OTHER PUBLICATIONS

Chen et al. ("Development and mechanism analysis of a highly efficient binder in pelletizing of ilmenite used in electric furnace." Journal of Iron and Steel Research International 25, (2018) 1232-1236.) (Year: 2018).*

*Primary Examiner* — Ricardo D Morales
(74) *Attorney, Agent, or Firm* — Secant IP, P.L.L.C.

(57) ABSTRACT

A method of processing iron ore fines from various possible sources, with particle size up to 0.15 mm (through 100 mesh sieve) with no or limited comminution, directly into the intense mixer, with a set of binders in specific proportions, aiming to optimize physical and metallurgical properties of the pellets with minimal binder addition, thus not compromising the quality of steel products. The binders are starch, sodium silicate and sodium hydroxide, among others. The mixture with adjusted moisture content goes through conventional balling discs or drums and size screening. The green pellets then undergo drying with forced air at around 150° C. for a short time. The pellets obtained have excellent metallurgical properties, and compression resistance around 70 kgf/pellets, without the high and undesirable economic and environmental costs of the conventional indurating process. An alternative embodiment (FIG. 3) considers indurating the pellets at temperatures below 1,200° C. to (Continued)

obtain similar mechanical resistance than pellets made by the conventional induration process, with temperatures above 1,300° C.

11 Claims, 2 Drawing Sheets

(56)                    References Cited

U.S. PATENT DOCUMENTS

| | | |
|---|---|---|
| 6,921,427 B2 | 7/2005 | Nayak et al. |
| 7,896,963 B2 | 3/2011 | Liu |
| 8,999,032 B2 | 4/2015 | Dutra et al. |
| 9,175,364 B2 | 11/2015 | Porto Pimenta et al. |
| 10,815,548 B2 | 10/2020 | Ramirez Alvarez et al. |
| 2014/0020511 A1 | 1/2014 | Pimenta et al. |

FOREIGN PATENT DOCUMENTS

| | | |
|---|---|---|
| BR | 102017023459 | 5/2023 |
| CN | 101586184 A | 11/2009 |
| CN | 104651605 A | 5/2015 |
| WO | 2004050924 A1 | 6/2004 |
| WO | 2012/112585 A2 | 8/2012 |
| WO | 2019/033187 A1 | 2/2019 |
| WO | 2020/122701 A1 | 6/2020 |
| WO | 2021/087582 A1 | 5/2021 |

* cited by examiner

LOWER TEMPERATURE PELLETIZING PROCESS OF IRON ORE FINES

TECHNICAL FIELD

This disclosure generally relates to the pelletizing process of iron bearing fines, specifically to the binders used and the consequent benefits.

BACKGROUND

As iron ore mines advance into their life cycle, the share of ore with high iron content in the total mine output gradually decreases, and the share of ore with low iron content, that needs concentration, increases. Concentration is performed with particles having a size smaller than 0.15 mm, and produces what commercially is called "pellet feed". This particle size is too small to be charged directly to reactors or furnaces, and for sintering, it must be agglomerated into larger pieces, and the pelletizing process is the most method for agglomerating, for several reasons. Thus the aging of mines is directly linked to the increasing relevance of the pelletizing process, reflected on capacity expansions and premium in prices.

SUMMARY

In accordance with one embodiment, a lower temperature pelletizing process of iron bearing fines consists of adding a mix of binders to said fines, and drying the resulting green pellets in temperatures lower than in the conventional induration process, to reach enough physical resistance for bulk handling and transportation, and to be fed into furnaces or reactors.

DETAILED DESCRIPTION

Figure 1:
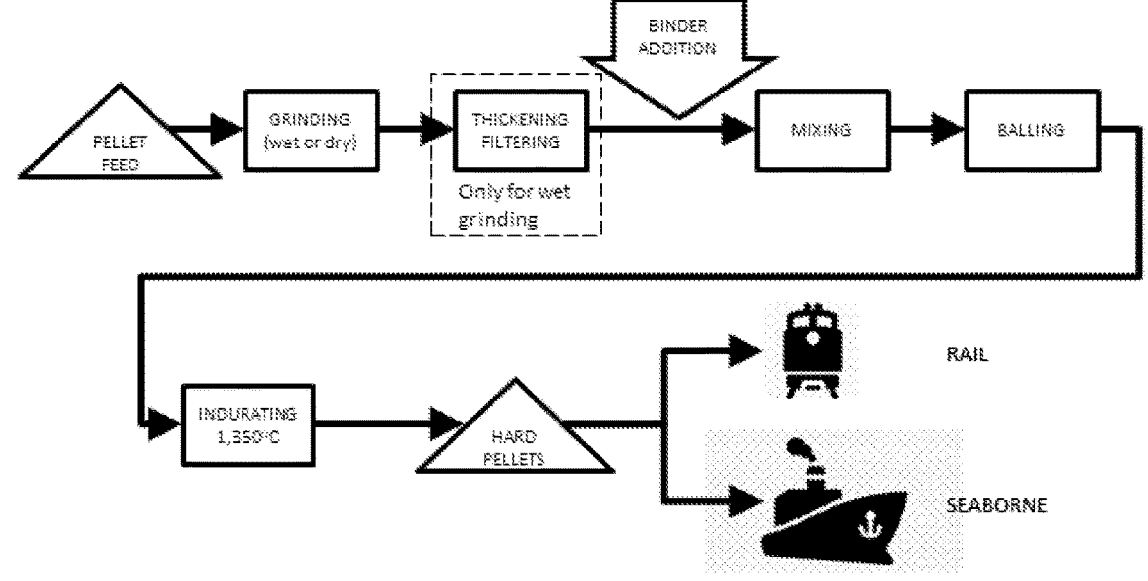
FIG. 1 shows a flowchart of the usual iron ore pelletizing process (prior art).

Historically, the process, shown in FIG. 1, consists of three main operations; comminution of the ore, balling, and then indurating at temperatures as high as 1,350° C.

In a first operation, the pellet feed, with particles smaller than, for example, 0.10 mm, 0.15 mm (100 mesh sieve) or 0.20 mm is ground to below 0.044 mm (325 mesh sieve). It is believed that high surface area is needed in the hardening phenomena that occur during the induration (hardening) operation. The material to be pelletized can have a high specific surface (or surface area), i.e., low particle size, about at least 1,500 $cm^2$ per gram (measured according to ISO 21283:2018). The comminution operation is often done through a wet grinding process, in which case additional thickening and filtering stages may be needed, but comminution may also be done through dry grinding. In some cases, the comminution also includes roller presses after or in place of the grinding mills. The comminution operation has a high energy consumption, that usually is in the proximity or above 20 kWh/t.

A second operation, the balling, begins with mixing the iron ore fines having a size below 0.044 mm with one or more binders, as well as a controlled amount of water in order to retain a moisture content of about 10%, for example, greater than 5%, greater than 8%, less than 12% or less than 15%, by weight. The mixture is homogeneous and oversize recirculating material can be reduced in size, such as by passing through a clod crusher.

Binders are used in the pelletizing of iron ore to facilitate the balling of the fines, increase the green and dry strength of the pellets, and improve the properties of the fired pellets.

Bentonite, an inorganic binder, has been the main binder used in the iron ore pelletizing process since the beginning of pellet production in the 1950s. Bentonite promotes the formation of ceramic bridges between particles in the induration at high temperature. Despite its low cost, the inorganic compounds from bentonite are contaminants increasing the amount of acid gangue in the pellet. This increases the amount of slag formed in iron and steelmaking, which add to the energy needs of such processes.

Organic binders have been used as an alternative to bentonite in the iron ore pelletizing process, mainly because they burn during high temperature induration without leaving any residue in the final pellet. There are two main types of organic binders, those based on cellulose compounds and other based on polyacrylamide polymers.

Pellets are typically formed by rolling the moist fine mixture in either a horizontal drum, or more usually an inclined disk, to form spheroids known as "green pellets". At this stage the green pellets are required to have mechanical resistance to support the transport from the balling discs (or drums) to the kiln for induration.

In a third operation, the induration, the pellets are fired. Firing is normally carried out in rotary kilns or travelling grate furnaces, also called straight grate furnaces, using gas or oil as fuel and often with the contribution of a small amount of solid fuel added to the green pellet prior to the balling process. The resulting fired pellets are typically spheroidal, between 8 and 18 mm diameter and have a cold compression strength of between 200 and 350 kgf per pellet (standard method ISO 4700). As such, they may be repeatedly bulk handled, for example in loading to railway cars, unloading of railway cars, at port facilities, at steel works and the like, and withstand the rigors of transportation in bulk. The pellet indurating process, with a firing temperature plateau of 1,350° C., has high thermal energy consumption, typically between 200 and 250 Mcal/t, and generates high residual stress (or thermal stress) in the material, which results in the appearance of cracks and fissures (20 to 40%) in the hardened pellets. The hardening mechanism in said induration process is by sintering of ore grains caused by solid state interaction of particles and also due to the presence of a liquid phase which can act as transport media to increase the sintering rate and promote bonding among ore particles. The major contribution to pellet strength occurs at temperatures above 1,200° C. and is caused by the formation of necks between ore grains followed by pellet densification.

The high temperatures achieved in the conventional induration process and the limitations of refractory and other materials used in the furnaces construction impose a limit to the capacity of said furnaces, usually about 8 million tons per year for a traveling grate and 6 million tons per year for grate kiln furnaces.

At traveling grate furnaces, which is the type used by about 60% of the worldwide installed capacity, part of the fired pellets return to be used as a hearth layer of around 10 cm at the bottom and sides of the green pellets bed, that is typically around 30 cm high. This layer protects the cars and grate bars from the high temperature the pellets achieve during induration. On the other hand, the pellets in the hearth layer, about a quarter or more of the furnace output, have their mechanical and metallurgical properties degraded due to exposure in the furnace for the second time.

By virtue of the scale of throughput required by the industry, the capital investment in equipment necessary for the induration stage of pelletizing is major, and the energy consumption is high. The electricity and fuel costs of operating a typical installation are said to total millions of dollars per year, besides the environmental impact caused by greenhouse gases release (GHG).

Many attempts have been made to find alternative agglomeration processes and in particular processes which would avoid the necessity for firing. To date no such process has proved satisfactory. The general requirements for good quality agglomerates include sufficient strength for handling and for long distance transportation, the ability to withstand outside storage without substantial detrimental effects and complete reducibility in iron and steel furnaces without premature degradation or excessive swelling.

Numerous so called cold or low temperature bonding processes have been developed in which inorganic binders such as cement, lime, magnesia, clays, bentonites and the like, or organic binder materials such as tars, petroleum residues, waxes, flours, paper industry by-products and polymers have been employed. In general the resulting pellets have been either too expensive to produce, are inadequate for scale production, worsen the chemical composition, worsen metallurgical performance and/or have been deficient in strength, impact resistance or abrasion resistance.

Example Embodiments

Figure 2:
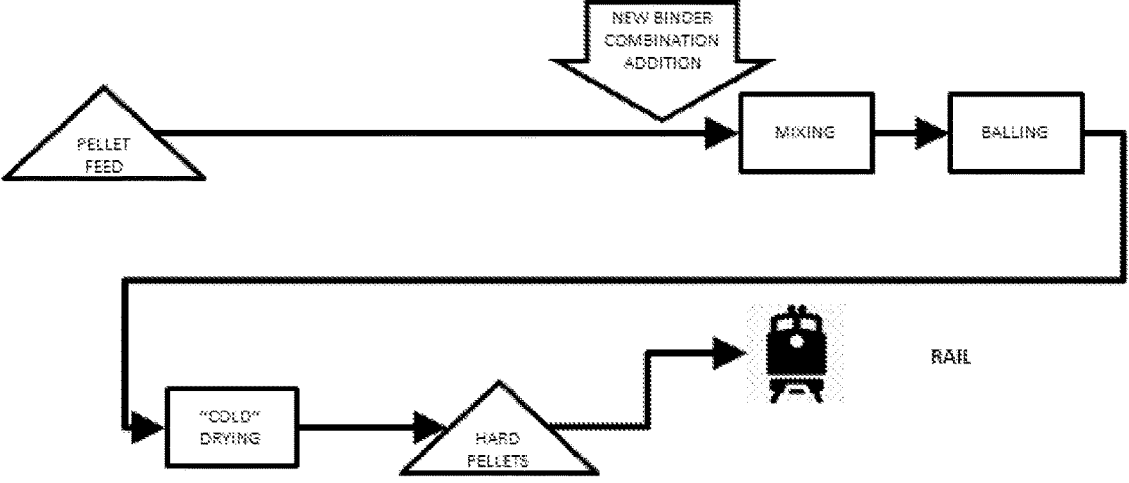
FIG. 2 shows a flowchart of first and second embodiments of the lower temperature pelletizing process, with a simple drying operation of the green pellets.

The following embodiments eliminate one or several of the disadvantages outlined above. One embodiment of a low temperature pelletizing process is illustrated in FIG. 2. This process makes possible the use of different ore fines. These fines can be regular pellet feed, fines generated from mining processing or even from industrial residues of blast furnaces or steel mills. One important benefit of this innovative agglomeration process is the possibility to produce hard pellets from these tailings and fines that are otherwise rejected. It also accommodates the use of poor ore fines within a wide range of chemical composition and still attends blast furnaces requirements.

The raw material used is particulate from iron bearing fines, usually iron ore fines smaller than 0.15 mm (through 100 mesh sieve), with all the particle size distribution in this range, optimizing the pellets properties and reducing the quantity of additives needed for their agglomeration. Since fines produced by iron ore mines shipped to pelletizing plants are typically under 0.15 mm, the need for comminution of pellet feed is drastically reduced or eliminated. In some embodiments, the conveyor belts for the reclaimed iron ore fines may link the stockyard directly to the mixing, prior to the balling process.

The binder addition process can utilize three silos equipped with weight dosing devices and two tanks with dosing pumps, and all their output combines with the iron ore fines into the mixer. In some embodiments, conveyor belts, for solid particulates, link the binder component storage bins to the mixer. The tanks with solutions may be linked through pipelines to the mixer or alternatively to spray heads aimed directly at the balling discs or drums. An alternative layout is to premix two of the components and have one tank with a combined mixture in the right proportion of two or more of the binders, and from there, be linked through dosing devices and pipelines to the mixer or balling equipment.

Examples of binders are described below:

Starch solid particulate, native or unmodified starch, pregelatinized or not, preferably from manioc, corn or beetroot Sodium hydroxide solution, typically at around 50% w/w concentration Sodium silicate solution, preferably with $SiO/Na_2O$ molar ratio in the 2.05-2.50 range, typically in 40% to 50% w/w concentration range Microsilica solid particulate, industrial raw material <0.15 mm (source: waste from the production of Fe—Si or metallic silicon)

Graphene solid particulate, graphene-based nanoplates <50 layers of graphene (source: material graphenic obtained from graphite by the chemical exfoliation method)

The mixing process can use intensive mixers to receive the iron ore fines, and all binders should be fully homogenized in the mixture. The mixers may be, for example, paddle mixers.

The balling circuit and equipment can be the same or different than that used in the conventional balling process and can include, for example, conveyor belts feeding balling discs or drums, water spray onto balling devices, roller screens for size classification and a recirculation circuit for off size pellets.

In one embodiment, the low temperature drying operation is performed in a dryer that exposes the green pellets to forced convection with heated air that may be mixed with other hot gases for thermal efficiency purposes. One alternative for this operation is to use a rotary dryer with counterflow of heated air, pure or mixed with other gases.

After the dryer, a screening device, for example, a vibrating screen, separates the fines for recirculation back to the mixer, and conveyor belts link it to the stockyard, shipment or consumption of the hard pellets. The conveyor belts and stockyards for said hard pellets are covered to offer protection against the rain.

The iron bearing fines supply to be agglomerated can typically comprise iron ore pellet feed, but can be a mix of any type of fines generated in the several stages of the iron and steel industry, as long as they have a particle size under 0.15 mm. According to the chemical composition of the iron bearing fines and the requirements for the pellets, it may be necessary to add small amounts of minerals, for example, limestone or dolomite, in order to achieve the required chemical composition, specially the MgO and CaO content. In the case of producing self-reducing pellets, fines from carbonaceous material such as coal may also be added. These additions to the iron bearing fines usually are done in the raw material pile in the stockyard, but it may happen at other times in the process, for instance, in the mixer, the same way the binders are added.

In various embodiments, the amount of binder components can differ. All values are based on dry pellet mass and are w/w. The starch content can be less than 3%, less than 2.5%, less than 2%, less than 1.5%, less than 1% or less than 0.6%. In other embodiments, the starch content can be greater than 0.1%, greater than 0.2% or greater than 0.3%. The sodium hydroxide (50%) content can be less than 3%, less than 2.5%, less than 2%, less than 1.5%, less than 1%, less than 0.6%, less than 0.3% or less than 0.2%. In other embodiments, the sodium hydroxide content can be greater than 0.01%, greater than 0.05% or greater than 0.1%. Sodium silicate content can be, for example, less than 3%, less than 2.5%, less than 2%, less than 1.5%, less than 1%, less than 0.6%, less than 0.3% or less than 0.2%. In other embodiments, the sodium silicate content can be greater than 0.01%, greater than 0.05% or greater than 0.1%. Microsilica and graphene content can be, independently, less than 2%, less than 1.5%, less than 1%, less than 0.6%, less than 0.3%, less than 0.2% or less than 0.1%. In other embodiments, the microsilica or graphene content can be greater than 0.01%, greater than 0.05%, greater than 0.1% or greater than 0.2%. Some preferred binder quantities used in the lower temperature pelletizing process are shown in Table 1, with different binder (additives) types and their respective proportion range (% w/w dry pellets). Water is also added to the mixer with the fines and the binders to ensure the appropriate moisture content for the following operations (up to 10%). Moisture content in the mixture can be, for example, by weight, greater than 1%, greater than 3%, greater than 5%, greater than 7% or greater than 9%. In other embodiments, the moisture content can be less than 15%, less than 12% or less than 10%. They may be added to the mixer individually or pre-mixed in the right proportion in a homogenous solution, suspension or in solid particulate form.

TABLE 1

| Example binder quantities used in the process (% w/w dry pellets) are provided below. Any one or any combination of two, three, four or five of these components can be used. | |
| --- | --- |
| BINDER | QUANTITY % |
| Starch | 0.5 to 1.5 |
| Sodium Hydroxide | 0.1 to 0.9 |
| Sodium Silicate | 0.1 to 1.5 |
| Microsilica | 0.001 to 0.6 |
| Graphene | 0.001 to 0.03 |

The nature and limited quantity of the additives, specially the Sodium Silicate, in this embodiment causes much lower levels of undesired chemicals for siderurgic products (steel or cast iron), such as Silica, Alumina, Phosphor, Sulfur and Sodium, to be incorporated in the pellets, when compared to other attempts of pelletizing at low temperatures, thus improving the performance in furnaces and reactors.

The homogenized mixture of ore fines and binders with the appropriate moisture content (up to 10%), is then transformed in green pellets through the balling process, either in discs or drums, with the controlled addition of water, followed by size separation using roller screens to ensure pellet diameter within specification, typically between 6 and 18 mm. Green pellets under or over size are recirculated. The balling process is similar to what is commonly practiced at the existing pelletizing plants.

The green pellets are then dried preferably for less than one hour under forced flow of air, pure or mixed with other gases, at a temperature greater than 100° C. and less than 200° C. In one embodiment the gas flow is about 150° C.+/−10° C. The drying process may also be performed at lower temperatures, although requiring longer time. The pellet compression resistance (measured according to ISO 4700:2015) can reach greater than 50 kgf, greater than 60 kgf or close to 70 kgf, and a porosity (open and closed) of less than 20%. This level of mechanical resistance is satisfactory for bulk handling, belt transportation, piling, reclaiming, dumping in and out of rail cars and charging into reactors or blast furnaces.

It is believed that the hardening mechanism in this embodiment is due to the size distribution of the particles (high surface area) with high reactivity or chemical affinity of the binders, which promotes microstructural consolidation at low temperatures, forming a relatively cohesive and porous matrix. This matrix involves granules, powders and colloids in close contact and, when the moisture is reduced, they form a consolidated glass-ceramic matrix from agglomerates within the pellets, possibly due to the formation and consolidation of hydration reactions, which chemically bind the particles.

The drying operation of green pellets eliminates the conventional high temperature induration process, and the resulting dried pellets may be piled in the stockyard, loaded directly into wagons for rail transportation or fed into the furnace or reactor. In some instances, the storage, transportation and handling should avoid direct exposure to the weather.

Using the process described herein, the comminution operation is totally or largely avoided, and the high temperature induration is replaced by a much simpler drying operation, the present embodiment represents much lower operating and capital costs, besides a large reduction in the release of greenhouse gases (GHG) compared to prior-art. Furthermore, this embodiment allows the process to be performed in a much smaller scale, since all the equipment needed may be scaled down in size or quantity, while the typical indurating machine is only economically viable for a production of several million tons/year. At the same time, the process may also be performed on a larger scale by using higher capacity equipment in multiple parallel lines.

Second Embodiment

This second embodiment is similar to the first one except for the drying operation, and can therefore be represented by the same figure, FIG. 2. Instead of drying under forced convection in an oven or other device alike, as in the first embodiment, the green pellets are transported and deposited in the drying area with minimum handling stress, meaning fewer and lower height drops in transfer points. All conveyor belts, transfer points and the drying area are covered for weather protection. From the drying area, pellets are then reclaimed and transported by land to consumers, for example, by rail, trucks or conveyor belts.

The operation in this second embodiment is the same as in the first one, with the exception of the drying operation. Instead of drying under forced flow of air at around 150° C., as in the first embodiment, the green pellets are transported and spread out in a drying area with minimum handling stress, since the green pellets have not yet acquired high physical resistance at this stage. The pellets are left to dry at ambient temperature and natural convection in the drying area for one to two days, depending on ambient temperature and humidity, until they reach the physical resistance needed for handling and transportation to consumers by land transport.

Third Embodiment

Figure 3:
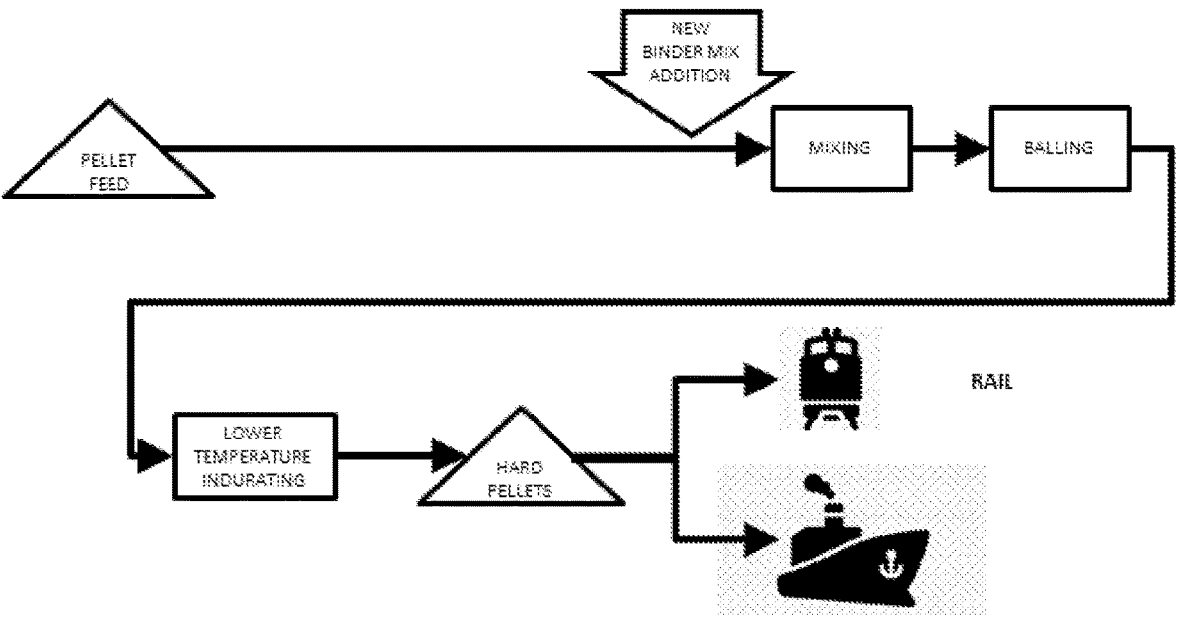
FIG. 3 shows a flowchart of a third embodiment of the lower temperature pelletizing process, with lower temperature induration.

An alternative embodiment of the low temperature pelletizing process of iron ore fines is illustrated in FIG. 3.

This embodiment uses the same types of iron ore fines, and the same range of particle size, meaning that the need for comminution of pellet feed can be eliminated also in this embodiment, allowing the conveyor belts for the reclaimed iron ore fines to link the stockyard directly to the mixing, prior to the balling process.

The New Binder Mix is the same as described in the first embodiment, with separate silos and tanks with weight dosing devices for each of the binders. The binding materials are also the same.

Mixing and Balling are also the same as previously described.

The Low Temperature Induration has a thermal cycle that can be limited to temperatures below 1300° C., below 1250° C., below 1200° C., below 1150° C. and about 1,100° C., lower than the conventional induration processes that typically reach 1,350° C. Despite the difference in the top temperature, the low temperature induration may be performed in the same type of equipment used in conventional induration, usually rotary kilns or travelling grate furnaces. In this embodiment, when using traveling grate furnaces, the recirculation of fired pellets to form the protective hearth layer may be largely reduced or even eliminated, since the firing temperatures may be low enough for the cars and grate bars to withstand the direct contact with pellets during the hardening process. After the low temperature induration, pellets go through screening and transportation to the stockyard, shipment—including seaborne—or local consumption of the hard pellets.

The binder quantities used in this alternative embodiment can be the same as described in Table 1.

Mixing and Balling operations can also be the same as previously described.

The green pellets then go through the low temperature induration, submitted to a thermal cycle of less than an hour long, and composed of three main stages:

Drying—gradual heating for vaporization of moisture without harming the integrity of pellets;

Firing—temperature plateau around 1,100° C. or below, according to the aimed mechanical resistance of indurated pellets (see Table 4);

Cooling—gradual cooling to recuperate the heat for the previous stages and allow handling of the output of hot pellets.

This embodiment allows the target for compression resistance of pellets to be set within 100 to 300 kgf/pellets by adjusting the parameters of the thermal cycle, in order to meet client and logistics requirements—including seaborne shipment—while optimizing operational cost and productivity. At traveling grate furnaces, the recirculation of fired pellets to form the hearth layer is set to a minimum or even eliminated, due to the lower top temperature, thus contributing to the quality, consistency, and performance of pellets.

The hardening mechanism in this embodiment is believed to be liquid phase sintering, and has two distinct stages:

1) Particle rearrangement: formation and viscous flow of liquid that wets the solid particles, spreads and joins the particles by capillary pressure, causing some densification.

2) Solution-precipitation: dissolution of small solid particles in the liquid and precipitation on the solid surfaces of large particles; particle-to-particle contacts and precipitation in uncompressed grains, sharp corners and precipitation on concave surfaces.

The resulting pellets may be piled in the stockyard, loaded into wagons or ships for transportation, or fed into furnaces or reactors.

The embodiments described above have been established by conducting a series of laboratory scale experiments to produce pellets from ore bearing fines and different composition and proportions of binding additives. The resulting pellets were examined to evaluate physical, chemical and metallurgical properties. The following example is given by a way of illustration and therefore should not be construed to limit the scope of the embodiments.

Example

The experiment used commercial high grade iron ore pellet feed with size distribution below 0.15 mm and no additives were used other than the binders mentioned in the embodiments herein described.

In order to evaluate the effect of the drying temperature in the mechanical resistance of pellets, parts of each sample were dried at temperatures from 150 to 1,100° C. in a cycle of one hour, and their compression resistance (kgf) are shown in Table 2.

TABLE 2

| Pellets mechanical resistance to compression by drying temperature (n = 21) | | |
|---|---|---|
| | Compression Resistance in each sample (kgf/pellets) | |
| Drying temperature (° C.) | Average | Std variation |
| 150 | 65 | 4 |
| 950 | 127 | 14 |
| 1,000 | 149 | 20 |
| 1,050 | 196 | 17 |
| 1,100 | 280 | 20 |

The pellets obtained from the iron ore fines after drying at 150° C. showed mechanical resistance to compression between 60 and 70 kgf per pellet, meaning that they meet the conditions for blast furnaces use, as they support bulk handling, land transportation (avoiding weathering) or their transshipment in industrial yards.

Table 2 also indicates that compression resistance higher than 200 kgf/pellet can be achieved with top temperatures between 1,050° C. and 1,100° C., well below the 1,350° C. usual in the conventional induration process. Furthermore, the data show that the mechanical properties continually improve as the top temperature is increased, different from the conventional induration process, where the hardening mechanism depends on phase change and grain growth, that only start to happen above 1,200° C.

The pellets dried at 150° C. for 30 min were subjected to metallurgical tests of crackling and degradation levels under direct reduction (ISO 13930), Reducibility (ISO 7215), Swelling (ISO 4698) and RDI (ISO 4696-2). See results in Table 3.

TABLE 3

| Metallurgical tests performed on pellets dried at 150° C. for 30 min (n = 10) | | | |
|---|---|---|---|
| | Results (%) | | |
| Tests | Reference | Average | Std variation |
| RDI (Reduction Degradation Index <2.80 mm)* | <20 | 10 | 5 |
| Reducibility** | >80 | 90 | 5 |
| Swelling*** | <20 | 16 | 3 |

*ISO 4696-2
**ISO 7215
***S04698

Thus several advantages of one or more aspects are to provide a method for pelletizing iron bearing fines which avoids or largely reduces the necessity to grind the pellet feed and to fire the pellets at high temperature, while producing pellets of sufficient mechanical resistance to permit handling, transportation and use in the manner usual for fired pellets, with much lower electrical and thermal energy consumption, and lower greenhouse gas (GHG) emissions, among other benefits.

Other advantages of one or more aspects are to provide a process that allows the production of pellets within a wide range of mechanical properties depending on the parameters of the thermal treatment, allowing energy savings in the process by indurating at temperatures much lower than in the conventional process.

From the description above, a number of advantages of some embodiments of the Low Temperature Pelletizing Process become evident:

The comminution operation is totally or largely avoided;

The induration happens at lower temperatures compared to the conventional induration process;

The hardening mechanism at induration is such that allows a more flexible operation, i.e., setting the thermal cycle parameters, like the top temperature, at just the necessary level for the pellets to achieve the required mechanical properties;

The pelletizing plant may be scaled down to attend the needs of small mines or small iron/steel makers wanting to insource the pelletizing operation;

The pelletizing plant may be scaled up due to lower temperatures achieved during induration, imposing lower thermal stress on the furnace materials;

Lower levels of undesired chemicals for steels or cast iron, such as Silica, Alumina, Phosphor, Sulfur and Sodium, incorporated in the pellets, when compared to prior art attempts of pelletizing at low temperatures;

Metallurgical properties of the pellets related to performance at consumers, such as RDI and reducibility, are outstanding, well above the acceptable limits.

The Low Temperature Pelletizing Processes described herein have a much lower operational cost, lower emission of greenhouse gases (GHG), and lower capital expenditure for new plants, compared to known processes.

Some of these benefits include:

The agglomeration of iron ore fines with particle size up to 0.15 mm (through 100 mesh sieve) avoids further comminution, eliminating or largely avoiding this energy intensive process that typically spends up to 20 kWh/t or more. The elimination of this operation may save in the proximity of a third of the electricity consumption of the conventional pelletizing process. By not using the equipment involved in comminution such as grinding mills, thickeners, filters, roller presses and pumps, there is also a reduction of the staff and maintenance costs;

The proposed process allows the induration operation to be done at top temperatures from 150° C. to 1,100° C., according to the mechanical properties needed for handling and consumption of the pellets. Thus even when producing pellets to achieve higher mechanical resistance requirements, the top temperature is still well below (and the length of stay is of the same order of magnitude) the typical 1,350° C. of the conventional process, resulting in lower fuel consumption, lower emissions of greenhouse gases (GHG), less deterioration of the refractories and other components, with consequent lower maintenance costs and higher working rate, and possibly increasing the capacity limit of pelletizing plants;

Where the induration is done at a traveling grate furnace, the recirculation of fired pellets to form the hearth layer may be largely reduced or even eliminated, resulting in efficiency and productivity improvements, besides contributing to the mechanical and metallurgical properties of the pellets;

The pelletizing plants eventually dedicated to operate exclusively in the lower range of mechanical properties, i.e., cold compression resistance around 70 kgf/pellet, may simply dry the pellets at around 150° C. in a much simpler device, for example, a counterflow rotary drier, instead of a conventional indurating machine. This may reduce the thermal energy consumption from the 200 to 250 Mcal/t range of the conventional process to around or less than 100 Mcal/t, with the greenhouse gases emissions (GHG) dropping in the same proportion, and a concurrent significant reduction in NOx emissions. The lower temperature and simpler equipment also result in a large reduction on the electricity consumption, that may fall from around 20 kWh/t in the conventional process to less than 10 kWh/t. Other implications are the reduction in staff and maintenance, and the improvement in working rate, compared to the conventional indurating process. Since the temperatures achieved are much lower, and the equipment much simpler than in the conventional induration, this solution may be implemented in a much wider range of scale, from one balling disc or drum with a small dryer to a large set of balling discs or drums with one or more large dryers, and can fit both large mining or steel companies and small mines or pig iron industrial facilities;

Besides the energy savings and reduction on GHG emissions, the low temperature pelletizing process is a relevant environmentally friendly solution for proper destination of mining fines and steel residues generated in the blast furnace and melt shop operation;

This process also causes an important reduction in capital expenditure, since grinding mills and other devices involved in the comminution operation represent a large part of the investment for new pelletizing plants. If the induration is done in a simple dryer instead of a conventional indurating machine, the capital reduction is even larger.

While the above description contains many specificities, these should not be construed as limitations on the scope of any embodiment, but as exemplifications of the presently preferred embodiments thereof. Many other ramifications and variations are possible within the teachings of the various embodiments. For example, the comminution operation may still be performed as in the conventional process, fully or partially, reducing the particle size below the usual pellet feed (0.15 mm), followed by the other operations as described in the embodiments. Another example is the drying of green pellets using solar oven technology during the transportation of the pellets or in a specific device for drying. The raw material to be pelletized may include other metals instead of iron, for example, manganese, chromium and iron-nickel. Even the fines agglomeration process itself, the pelletizing, may be broadened to encompass less common agglomeration routes such as briquetting and extrusion, that also may be benefited by the embodiments described herein. The scope of the invention should be determined by the appended claims and their legal equivalents, and not by the examples given.

What is claimed is:

1. A binder composition for pelletizing iron bearing fines, the composition comprising starch in a range of 0.2% w/w to 3.0% w/w; sodium hydroxide in a range of 0.05% w/w to 1.5% w/w; sodium silicate in a range of 0.05% w/w to 3.5% w/w; microsilica in a range of 0.001% w/w to 1.5% w/w and; graphene in a range of 0.001% w/w to 0.5% w/w.

2. The binder composition of claim 1 further comprising the iron bearing fines wherein the iron bearing fines exhibit a particle size up to 0.15 mm.

3. Green pellets comprising the composition of claim 1 wherein said green pellets are dried and hardened (liquid phase sintering) using forced flow of air at low temperatures between 100° C. and 200° C. or by natural convection at room temperature.

4. The composition of claim 1 configured for lower temperature induration and improvements in metallurgical properties using temperatures below 1200° C., the metallurgical properties selected from one or more of compressive strength, reduction degradation Index (RDI), abrasion index, reducibility, swelling, density and porosity.

5. A method for pelletizing iron ore fines, the method comprising: i. combining starch in a range of 0.5% w/w to 3.0% w/w; sodium hydroxide in a range of 0.05% w/w to 1.0% w/w; sodium silicate in a range of 0.05% w/w to 3.5% w/w; graphene in a range of 0.001% w/w to 0.5% w/w; and the balance being iron bearing fines; ii. mixing the iron bearing fines with the sodium hydroxide, sodium silicate, graphene, and starch to produce a mixture; and iii. rolling the mixture in balling discs or drums to form green pellets.

6. The method of claim 5 wherein the iron bearing fines have a particle size up to 0.15 mm.

7. The method of claim 5 comprising drying the green pellets using forced flow of air at temperatures below 500° C.

8. The method of claim 5 comprising drying the green pellets by natural convection at ambient temperatures.

9. The method of claim 5 comprising drying the green pellets at temperatures between 100° C. and 200° C.

10. The method of claim 5 wherein the process temperature does not exceed 1200° C.

11. The method of claim 5 comprising indurating in a traveling grate furnace without a hearth layer.

* * * * *